Patented Sept. 22, 1953

2,653,167

UNITED STATES PATENT OFFICE 2,653,167

METHOD FOR THE PREPARATION OF CYCLOHEXENE-4-CARBOXYLIC ACIDS

Jacob Eden Jansen, Akron, and Frank X. Werber, North Royalton, Ohio, assignors to The B. F. Goodrich Company, New York, N. Y., a corporation of New York No Drawing. Application July 18, 1951, Serial No. 237,478

10 Claims. (Cl. 260—514)

This invention relates to a novel method for preparing cyclohexene-4-carboxylic acids, and pertains more particularly to the preparation of such compounds by the reaction of beta-lactones with conjugated polyenes.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone), which has the formula

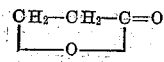

is economically obtained from ketene and formaldehyde. The ease with which beta-propiolactone and other lactones are now obtained makes it desirable to use these compounds as starting materials in the synthesis of many other useful compounds.

It has now been discovered that beta-lactones and beta-lactone polymers undergo a Diels-Alder reaction with conjugated polyenes such as butadiene-1,3 to give cyclohexene-4-carboxylic acids which are very valuable in organic synthesis. For example, aliphatic dicarboxylic acids are obtained by alkaline isomerization and cleavage of the cyclohexene ring. Esters of the dicarboxylic acids obtained in this manner are useful as plasticizers for synthetic resins and rubbers, and as additives for lubricating oils. The cyclohexene ring of the adducts may also be split by oxidation to give tricarboxylic acids and may be reduced to give cyclohexane carboxylic acids which are useful as selective herbicides. Moreover, the cyclohexene-4-carboxylic acids are useful per se as insecticides, fungicides, and for many other purposes.

The Diels-Alder reaction of beta-lactones with polyenes according to this invention proceeds substantially as shown by the following equation, wherein the most simple diene, butadiene-1,3, is used for illustrative purposes:

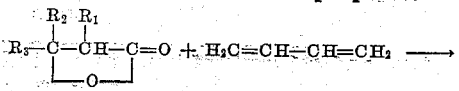

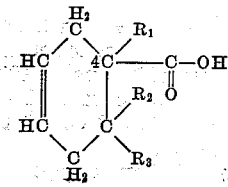

wherein $R_1$, $R_2$ and $R_3$ represent hydrogen, alkyl, aralkyl, aryl or substituted alkyl, aryl or aralkyl radicals.

The beta-lactone employed may be any lactone of a beta-hydroxy monocarboxylic acid which has at least one hydrogen atom on the alpha carbon atom, for example, beta-lactones of saturated aliphatic monocarboxylic acids such as beta-propiolactone, beta-butyrolactone, alpha-methyl beta-propiolactone, beta-n-valerolactone, alpha-methyl beta-butyrolactone, alpha-ethyl beta-propiolactone, alpha-methyl beta-valerolactone, beta-methyl beta-ethyl beta-propiolactone, alpha-propyl beta-propiolactone, alpha-butyl beta-methyl beta-propiolactone, or the like as well as polymers of such beta-lactones; beta-lactones of substituted carboxylic acids such as beta-phenyl beta-propiolactone, alpha-phenyl beta-propiolactone, beta-chloroethyl beta-propiolactone, beta-benzyl beta-propiolactone, alpha-benzyl beta-propiolactone, beta-cyclohexyl beta-propiolactone and the like and polymers of these beta-lactones, as well as other beta-lactones and beta-lactone polymers of the nature hereinabove set forth. Especially preferred beta-lactones for use in the practice of this invention are the saturated aliphatic beta-lactones; that is, those betal-lactones wherein $R_1$, $R_2$ and $R_3$ in the above formula represent hydrogen or an alkyl radical, with the water-soluble saturated alphatic beta-lactones forming a particularly preferred class of beta-lactones; those beta-lactones which contain from 3 to 6 carbon atoms possess the property of being water-soluble.

The polyene which is reacted with the beta-lactone to form a cyclohexene-4-carboxylic acid may be any conjugated acylic or alicyclic polyene capable of forming a Diels-Alder adduct and preferably containing from 4 to 10 carbon atoms. The term alicyclic wherever used hereinafter is intended to encompass compounds which contain a ring of carbon atoms but which do not belong to the aromatic series. Included among such polyenes are the following:

Acyclic or conjugated polyenes such as butadiene-1,3, isoprene, 2-methylpentadiene-1,3, piperylene, 3 - methylpentadiene - 1,3, 2,3 - dimethyl-butadiene-1,3, 2-neopentylbutadiene-1,3, 1-phenylbutadiene-1,3-, 2-phenylbutadiene-1,3, 2-chlorobutadiene-1,3, 2-bromobutadiene-1,3, 2-fluorobutadiene-1,3, hexadiene-2,4, hexatriene-1,3,5, 2-methylhexatriene-1,3,5, 1,6-diphenylhexatriene-1,3,5, myrcene, allo-ocimene, and the like;

Alicyclic conjugated polyenes such as cyclopentadiene, cyclohexadiene, cycloheptadiene, 1,2,6,6 - tetramethylcyclohexadiene, methylenecyclopentadiene, 1,5,5-trimethylcyclopentadiene, 5-isopropyl-2-methyl 1,3 cyclo-hexadiene, 6,6-dimethyl fulvene, and the like.

As disclosed hereinabove, both beta-lactones and beta-lactone polymers react with conjugated polyenes in accordance with the present invention. Beta-lactone polymers are readily prepared simply by heating the beta-lactone either alone or in the presence of a catalyst such as an acid or base or a metal salt. Beta-lactone polymers vary in character from colorless, viscous oils to white solids depending on their molecular weight, the higher molecular weight polymers being solid in nature.

The relative amounts of beta-lactone and polyene utilized in carrying out the process of this invention may be varied widely. For example, the reactants may be brought together in equimolar quantities, or a stoichiometric excess of either reactant may be used; in general, however, it has been found that optimum yields of the cyclohexene-4-carboxylic acid are obtained when a slight excess of the conjugated polyene is used, for example, about 1.1 to 1.5 moles of the polyene for each mole of the beta-lactone or for each lactone unit in the beta-lactone polymer.

The reaction is best carried out by first placing the beta-lactone or beta-lactone polymer in a pressure reactor such as an autoclave, and adding the conjugated polyene, which is ordinarily a gas or liquid and is therefore most easily pumped into the reactor. The reactants are then heated at 100° to 250° C. and at autogenous pressures for approximately 1 to 2 hours whereupon reaction occurs to form the desired cyclohexene-4-carboxylic acid. Generally equivalent results are obtained by reversing the order of addition, that is, by adding the beta-lactone or beta-lactone polymer to the polyene reactant. The product can be recovered in substantially pure form simply by distilling the reaction mixture, preferably at reduced pressures.

When beta-lactone polymer is to be used in the process of this invention a desirable expedient consists in placing the monomeric beta-lactone and polymerization catalyst in the autoclave and carrying out the polymerization and subsequent reaction with the conjugated polyene in situ. It is also desirable that a polymerization inhibitor such as hydroquinone or tertiary butyl catechol be added to the reaction mixture to prevent polymerization of the monomeric materials present therein.

Although no catalyst is necessary in the process of this invention, catalytic quantities of an alkaline material such as alkali metal hydroxides and alkali metal carbonates are advantageously utilized to accelerate the reaction. Acidic materials and metal salts may also be present in catalytic quantities during the process.

The method of reacting beta-lactones and beta-lactone polymers with polyenes in accordance with the process of the present invention is set forth more fully in the following examples which are intended as illustrative only since numerous modifications and variations therein will be apparent to those skilled in the art. In the examples all parts are by weight.

*Example I*

576 parts (97% purity, 7.75 moles) of beta-propiolactone, 500 parts (9.25 moles) of butadiene-1,3 6 parts of potassium carbonate and 2 parts of hydroquinone are placed in a stainless steel autoclave and the mixture heated to about 200° C.; exothermic reactions take place at about 100° C. and 200° C., raising the temperature to 270° C. for a short time. The temperature is then maintained at 200° C. for 1.5 hours after which the crude reaction product is distilled; and 937 parts (96% based on the beta-propiolactone content of the starting material) of cyclohexene-4-carboxylic acid are obtained. (B. P. 126° C./16 mm., 123° C./13 mm.; $N_D^{25}$=1.4780; $d_4^{25.5}$=1.0715; M. P. 15.0° C.)

*Example II*

5 parts of potassium carbonate and 1 part of hydroquinone are heated to 170° C. in a stainless steel autoclave. A mixture of 432 parts beta-propiolactone (97% purity, 5.82 moles) and 476 parts (7.0 moles) of isoprene is then pumped into the autoclave. The temperature rises to 205° C. and is maintained at that point for 1 hour. Distillation of the resulting reaction mixture gives 750 parts (92%) of a mixture of methyl cyclohexene-4-carboxylic acids (B. P. 93° C./0.9 mm.; 129° C./10 mm.; M. P. 75°–90° C.; believed to be predominantly the para isomer, 1-methyl cyclohexene-4-carboxylic acid).

*Example III*

A mixture of 241 parts of beta-propiolactone (97% purity, 3.25 moles) and 300 parts of dicyclopentadiene (which changes into cyclopentadiene at the reaction temperature) are pumped into a stainless steel reaction bomb containing 5 parts of potassium carbonate and 7 parts of hydroquinone, the bomb being maintained at a temperature of 180° C. After 1.25 hours the crude reaction product is distilled to give 3,6-endomethylene cyclohexene-4-carboxylic acid resulting from the reaction of cyclopentadiene with beta-propiolactone, in a yield of 415.3 parts (92.5%, based on weight of the beta-lactone). The product boils at 120.5°–121.5° C./10 mm.; literature value, 132–134° C./22 mm.

*Example IV*

Beta-propiolactone polymer is prepared by heating the lactone in the presence of copper acetate. 167 parts of the polymer thus prepared is charged, together with 138 parts (2.56 moles) of butadiene-1,3 and 1.0 part of hydroquinone into a stainless steel rocking autoclave which is first purged with nitrogen; the autoclave is then sealed, the rocker started and the bomb heated to about 160° C. at which point an exothermic reaction takes place and the temperature rises to a maximum of 191° C. The bomb is then opened and the reaction mixture distilled whereupon 228 parts (79%) of cyclohexene-4-carboxylic acid are obtained. (B. P. 132° C./21 mm.; M. P. 15° C.; $d_4^{25}$=1.0715 and $n_d^{25}$=1.4771.)

*Example V*

5 parts of potassium carbonate and 1 part of hydroquinone are heated to 170° C. in a stainless steel autoclave. A mixture of 432 parts of beta-propiolactone and 476 parts of isoprene are then pumped into the autoclave over a 1 hour period during which time the temperature rises to 205° C. The reaction mixture is then distilled whereupon 750 parts (92% of theory) of a mixture of isomeric methyl cyclohexene-4-carboxylic acids (B. P. 93° C./0.9 mm.; 129° C./10 mm.) are obtained.

When this example is repeated substituting beta-butyrolactone for the beta-propiolactone, 5-methyl cyclohexene-4-carboxylic acid is obtained in good yield. Moreover, when the examples are repeated utilizing other of the beta-lactones having at least one hydrogen atom attached to the alpha-carbon atom, or substituting other of the polyenes disclosed hereinabove for those utilized in the examples, cyclohexene-4-carboxylic acids are again obtained.

From the foregoing description of the invention, it will be seen that the reaction of beta-lactones with conjugated polyenes constitutes a new, improved and economical method for producing cyclohexene-4-carboxylic acids, a widely useful class of materials. It is apparent, therefore, that various embodiments of the invention, in addition to those specifically disclosed, may be provided without departing from the spirit and scope of the invention as defined in the appended claims.

We claim:

1. The method which comprises reacting a member of the class consisting of beta-lactones having at least one hydrogen atom on the alpha carbon atom, and homopolymers of said beta-lactones, with a member of the class consisting of acyclic and alicyclic polyenes, at a temperature of from about 100° C. to 250° C., thereby to obtain a cyclohexene-4-carboxylic acid.

2. The method which comprises reacting a member of the class consisting of beta-lactones having at least one hydrogen atom on the alpha carbon atom, and homopolymers of said beta-lactones, with an acyclic conjugated diene, at a temperature of from about 100° C. to 250° C., thereby to obtain a cyclohexene-4-carboxylic acid.

3. The method which comprises reacting a member of the class consisting of beta-lactones having at least one hydrogen atom on the alpha carbon atom, and homopolymers of said beta-lactones, with an alicyclic conjugated diene, at a temperature of from about 100° C. to 250° C., thereby to obtain a cyclohexene-4-carboxylic acid.

4. The method which comprises reacting at autogenous pressure a saturated aliphatic beta-lactone and an acyclic conjugated diene, at a temperature of from about 100° C. to 250° C., thereby to obtain a cyclohexene-4-carboxylic acid.

5. The method which comprises reacting at autogenous pressure, at a temperature of about 100° C. to 250° C. and in the presence of an alkali metal carbonate, a saturated aliphatic beta-lactone and an acyclic conjugated diene, and distilling the resulting reaction mixture, thereby to obtain a cyclohexene-4-carboxylic acid.

6. The method of claim 5 wherein the beta-lactone utilized is beta-propiolactone and the acyclic conjugated diene is butadiene-1,3, the product recovered being cyclohexene-4-carboxylic acid.

7. The method of claim 5 wherein the beta-lactone utilized is beta-propiolactone and the acyclic conjugated diene is 2-methyl butadiene-1,3, the product recovered being a mixture of 1-methyl cyclohexene-4-carboxylic acid and 2-methyl cyclohexene-4-carboxylic acid.

8. The method which comprises reacting at autogenous pressure a saturated aliphatic beta-lactone and an alicyclic conjugated diene, at a temperature of from about 100° C. to 250° C., thereby to obtain a cyclohexene-4-carboxylic acid.

9. The method which comprises bringing together at autogenous pressure, at a temperature of about 100° C. to 250° C. and in the presence of an alkali metal carbonate, a saturated aliphatic beta-lactone and an alicyclic conjugated diene, and distilling the resulting reaction mixture, thereby to obtain a cyclohexene-4-carboxylic acid.

10. The method of claim 8 wherein the beta-lactone utilized is beta-propiolactone and the alicyclic conjugated diene is dicyclopentadiene, the product recovered being 3,6-endomethylene cyclohexen-4-carboxylic acid.

JACOB EDEN JANSEN.
FRANK X. WERBER.

References Cited in the file of this patent

UNITED STATES PATENTS

| Number | Name | Date |
|---|---|---|
| 2,487,885 | Magoffin et al. | Nov. 15, 1949 |